(12) United States Patent
Rushford (10) Patent No.: US 8,934,097 B2
(45) Date of Patent: Jan. 13, 2015

(54) LASER BEAM CENTERING AND POINTING SYSTEM

(75) Inventor: Michael Charles Rushford, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 956 days.

(21) Appl. No.: 12/696,777

(22) Filed: Jan. 29, 2010

(65) Prior Publication Data
US 2010/0188669 A1    Jul. 29, 2010

Related U.S. Application Data

(60) Provisional application No. 61/148,243, filed on Jan. 29, 2009.

(51) Int. Cl.
  *G01B 11/00* (2006.01)
  *G01B 11/27* (2006.01)
(52) U.S. Cl.
  CPC .................... *G01B 11/272* (2013.01)
  USPC ........................................ 356/401
(58) Field of Classification Search
  USPC ................................ 356/401, 450
  See application file for complete search history.

(56) References Cited

U.S. PATENT DOCUMENTS 6,268,920 B1 *  7/2001  Ohlig ............................ 356/401
  2009/0207412 A1 *  8/2009  Mahmood et al. ............ 356/406

* cited by examiner

*Primary Examiner* — Hwa Lee
(74) *Attorney, Agent, or Firm* — John P. Wooldridge (57) ABSTRACT

An optical instrument aligns an optical beam without the need for physical intervention of the instrument within the apparatus or platforms from which the trajectory of the beam to be ascertained. The alignment apparatus and method enable the desired function to be realized without the placement of physical apertures or sensors directly in the path of the beam through the system whose spatial position and slope is to be sought. An image plane provides the observer with a pair of well-defined images that are indicative of the beam centering and pointing alignment parameters. The optical alignment can be realized without the need for referencing to an external or fixed set of coordinates or fiducials. The instrument can therefore service situations where adverse environments would otherwise prohibit the use of such instruments, including regions of high radiation, high temperature, vacuum and/or cryogenic atmospheres.

22 Claims, 8 Drawing Sheets

LASER BEAM CENTERING AND POINTING SYSTEM

CROSS-REFERENCE TO RELATED APPLICATIONS

This application claims the benefit of U.S. Provisional Patent Application No. 61/148,243 titled "Centering and Pointing System," filed Jan. 29, 2009, the disclosure of which is hereby incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to optical beam alignment systems, and more specifically, it relates to compact, non-invasive optical beam alignment systems for centering and pointing of an optical beam from a remote location.

2. Description of Related Art

Devices to align an optical beam in space are well known in the art. The prior art in the area of optical beam alignment typically requires two optical sensors, or apertures with a detector, with each sensor located at a different point in space. (An example of a sensor can be a pinhole aperture mounted onto an optical detector.) The dual-sensor requirement stems from the fact that an optical beam can be described in geometrical terms as a straight line. The precision of an alignment tool improves as the physical separation between the pair of sensors increases. The trajectory of an optical beam in space can be specified by a given point in space (e.g., its centering location at one aperture) and by the slope of the beam (e.g., the pointing direction of a beam from a given aperture to a second aperture).

However, situations exist where the separation between the pair of sensors is limited to a small distance. Moreover, there exist cases where is it highly impractical, and, in other cases, deleterious, to locate one or a pair of optical detectors at different locations within a confined system with a separation distance sufficiently great to determine the spatial location of an optical beam with a specified precision. Examples of adverse environments include high vacuum chambers, high temperature or cryogenic environments, high radiation situations, etc.

The prior art also includes pointing and tracking techniques, which can he open loop or servo-controlled to determine and position a laser beam along a given propagation path. Such systems also require the determination of two parameters, namely, the centering of a laser beam at a given point in space, and its pointing direction relative to that point. Again, a pair of sensors is required for this operation. This is typically accomplished using a pair of pinhole apertures, positioned at locations such that an optical beam passes through both pinholes. A variation on this approach is to place optical beam splitters at the approximate locations through which the beam must pass. Each beam splitter reflects a small fraction of the optical beam power to a respective precision pinhole/detector module. The location of the beam as it passes through the pair of pinhole detectors will thusly define its spatial coordinates. The beam splitters typically allow for most of the power in the optical beam to pass through the beam splitters. Therefore, the location of the beam is established in space with minimal loss of optical power required for measurement and alignment purposes. The prior art, however, requires the presence of a pair of spatial fiducial locations, each with its respective detector, and with a minimal separation between them to determine the propagation direction of the beam with a given precision.

The need for a pair of such sensors adds complexity to the system, since two pinholes, two detectors, and, possibly, two beam splitters are required, in addition to optical mounts, fixtures and electronic processors. In addition, the pair of beam splitters must be of high optical quality as to not distort the main beam as it is directed to its target. Also, the beam splitters must be sufficiently large in cross section as to not obscure the main beam. In addition, although the beam splitter will preserve the angle of incidence of the beam as it exits the splitter, it will, however, physically displace the transmitted beam a small distance parallel to the incident beam, the displacement depending on the thickness of the beam splitter. These requirements add complexity, cost and weight as well as requiring space for their installation, and, access for their maintenance.

The prior art also includes various forms of aiming devices including telescopes, gun sights, and surveyor apparatus. In these systems, to align the beam, a viewer (or camera) has to focus first on one mask at given location within the sight (such as a crosshair, located at the entrance to the instrument), and, then focus on another sight, typically located at the extreme opposite end of the device. The presence of a pair of separated crosshairs does not permit simultaneous measurements, given the necessity to refocus ones eye or machine vision system, resulting in a greater time to complete the measurement. As an example, one defocused sight may interfere with the viewer or camera during the time that one attempts to concentrate and focus on the other sight. Also, since the patterns are fixed in time, the sight geometry may not be optimal during the convergence process. Hence, there is a need to decouple the pair of sights as well as to provide a means that can enable one or both sight-patterns to dynamically change in real-time, as necessary, so that the path to alignment convergence is minimized in terms of residual error, time, and, moreover, accommodating to random effects such as vibrations, obscuring objects in the field of view, and beam wander.

Therefore, there is a need to relax the critical cost, weight and complexity requirements to provide a pair of spatially dispersed sensors necessary to ascertain, set and maintain the centering and pointing parameters of an optical beam, even in the presence of platform vibration, target obscuration and beam wander. Moreover, in some cases, it is highly desirable to enable noninvasive placement of a compact, rugged diagnostic completely external to a given structure (with optical access).

SUMMARY OF THE INVENTION

The present invention overcomes these restrictions and limitations, and, therefore, improves on the prior art regarding laser beam position measurements. Embodiments of this invention consists of a single optical device, comprising a pair of optical imaging lens systems, a reference pattern (e.g., a crosshair or a programmable mask) and a camera or other video instrument placed at an image plane. All these components can be mounted into a rigid telescope package, resulting in a compact, handheld device that can be mounted onto a platform from which a laser beam is to be aligned, in a noninvasive manner. This multi-lens alignment system is configured to form a pair of co-axial image planes, referred to as reference planes, both placed along a single optical axis, with a given spatial separation between the reference planes. As an example, an incident plane-wave Optical beam (e.g., bearing no spatial information) will thusly converge to a focused spot at each of the respective reference planes as it propagates through the system. Both reference, or focal, planes are imaged onto a common plane, where a camera or other video instrument is positioned, thereby forming a pair of respective high-resolution images at the common camera plane. Since both reference planes are both imaged at the same time, there is no need for one to refocus an optical system (or, human eye) to perform the measurement. During operation of this invention, a spatial mask pattern is positioned directly upstream of the input lens. This mask imposes a well-defined pattern onto the beam as it enters the system. A different image, in general, is formed at each reference plane in the alignment instrument. The pair of images is then re-imaged at the common camera plane, located at the output end of the system. Each reference image is in the form of a distinguishable pattern, with each pattern being a high-fidelity image from its respective focal plane.

The pair of focal plane locations is equivalent to a pair of apertures that comprise a conventional optical alignment system. However, in the present invention, each physical aperture is now in the form of a focused beam along a common axis. Hence, by viewing the pair of imaged focal planes on the camera, the centering and pointing functions can be accomplished by overlapping one image with the other image. When the pair of reference images is properly aligned at the camera plane, this is equivalent to aligning a beam through a pair of pinhole apertures in a conventional alignment system, thereby determining the centering and pointing parameters that define the trajectory of the optical beam. Since this instrument does not require the placement of physical apertures or sensors within the system to be aligned, the beam alignment can be performed at a standoff distance from the overall structure to be characterized. Moreover, since the beam passes through both masks at an angle perpendicular to its respective surface, the system does not impose a systematic displacement of the beam (as would be the case for off-axis beam splitters).

One can describe this invention as a means to form a pair of "virtual optical apertures" along a common optical axis in space, and, then form an image of each respective virtual aperture at a common camera plane. The virtual apertures are equivalent to a pair of pinhole apertures, but, in contrast to the prior art, no physical aperture or sensor is required at those locations. Instead, the spatial information at each virtual plane is imaged to a common plane in space, removed from the actual location where an aperture would have been positioned. By examining the pair of images formed at this common image plane, one can remotely ascertain the propagation path of an incident optical beam that traversed the pair of virtual optical apertures. As such, the invention is a non-invasive, remote diagnostic, which does not require placement of physical apertures, detectors and associated mounting fixtures within a given optical structure to be aligned. Hence, all the relevant alignment information, which would have been sensed at the locations of physical components in the prior art, is all imaged to a different, remote location.

Furthermore, the invention provides a means to effectively decouple the virtual pinholes over space and/or time, so that each pattern can be viewed individually, without the presence of the other pattern. In addition, the present invention provides a means to dynamically change the pattern so that, as the system converges, the patterns(s) can spatially adapt to enable finer adjustments and more rapid convergence times. Some aspects of this invention are summarized as follows:

It is one aspect of this invention to determine the alignment of an optical beam using a single, compact and rugged optical instrument.

It is another aspect of this invention to perform an alignment function without the need of physical apertures and/or other classes of sensors positioned along the beam path.

It is further an aspect of this invention to accomplish such an alignment function by determining the centering location and pointing direction of an optical beam through a sequence of fiducial planes, with each plane is located along a common optical axis.

It is another aspect of this invention to image a sequence of fiducial planes onto a common observation plane to perform the necessary alignment procedure to characterize the optical beam in space.

It is another aspect of this invention to configure the optical alignment system so that the reference planes are spatial Fourier transforms of each other.

It is another aspect of this invention to configure the optical alignment system so that the reference planes are formed by a sequence of lens waveguides.

It is yet another aspect of this invention to configure the alignment system so that the reference planes are located at difference imaging locations along the optical axis.

It is yet another aspect of this invention to provide a means to independently manipulate the pair of optical patterns at a common observation plane to characterize the alignment of the optical beam.

It is still another aspect of this invention to accomplish the desired alignment function by manipulating the pair of independent optical patterns at the camera plane without the need for absolute registration of such patterns with respect to an external reference or fiducial point.

It is another aspect of this invention to provide independent spatial masks at one or more predetermined planes along the optical axis of the measurement apparatus, yet remote from the structure or platform through which the beam passes. The spatial masks result in different optical patterns with each respective pattern imposed onto the laser beam at each respective fiducial location, or plane, along the beam path.

It is another aspect of this invention to provide one or more spatial masks in the form of an amplitude pattern.

It is another aspect of this invention to provide one or more spatial masks in the form of a phase pattern.

It is another aspect of this invention to provide one or more spatial masks in the form of a programmable amplitude and/or phase pattern which can be updated in real time, thereby optimizing the convergence process temporally and, additionally, minimizing residual centering and pointing errors.

It is still another aspect of this invention to temporally modulate one or more dynamic spatial masks to provide a set of different reference patterns at the camera plane so that each such reference mask results in an optimal image pattern necessary to more accurately determine the centering and pointing parameters of the optical beam.

It is further an aspect of this invention to electronically gate, or switch, amongst the reference patterns so that optical interference or deleterious spatial crosstalk effects are minimized so that each pattern can be viewed independently from the other, resulting a centering and pointing measurement with minimal complexity.

It is another aspect of this invention to generate one or more spatial masks so that the pair of resultant images patterns at the camera plane coherently combines at the camera plane to provide precise interferometric information so that fine-detailed centering and pointing measurements can be determined.

It is also an aspect of this invention to form a closed-loop system so that the video information at the camera plane can be processed in real-time, where processing algorithms provide spatial pattern information that can be imposed onto the dynamic reference mask, thereby enabling enhanced performance in terms of more precise centering and pointing determination of the incident optical beam, as the fundamental measurement limits of the instrument are approached.

In what follows below, we describe and teach exemplary embodiments which can result in the desired aspects as outlined heretofore. It is to be understood by those skilled in the art that various related embodiments can follow from, or be derived by, the teachings presented herein.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
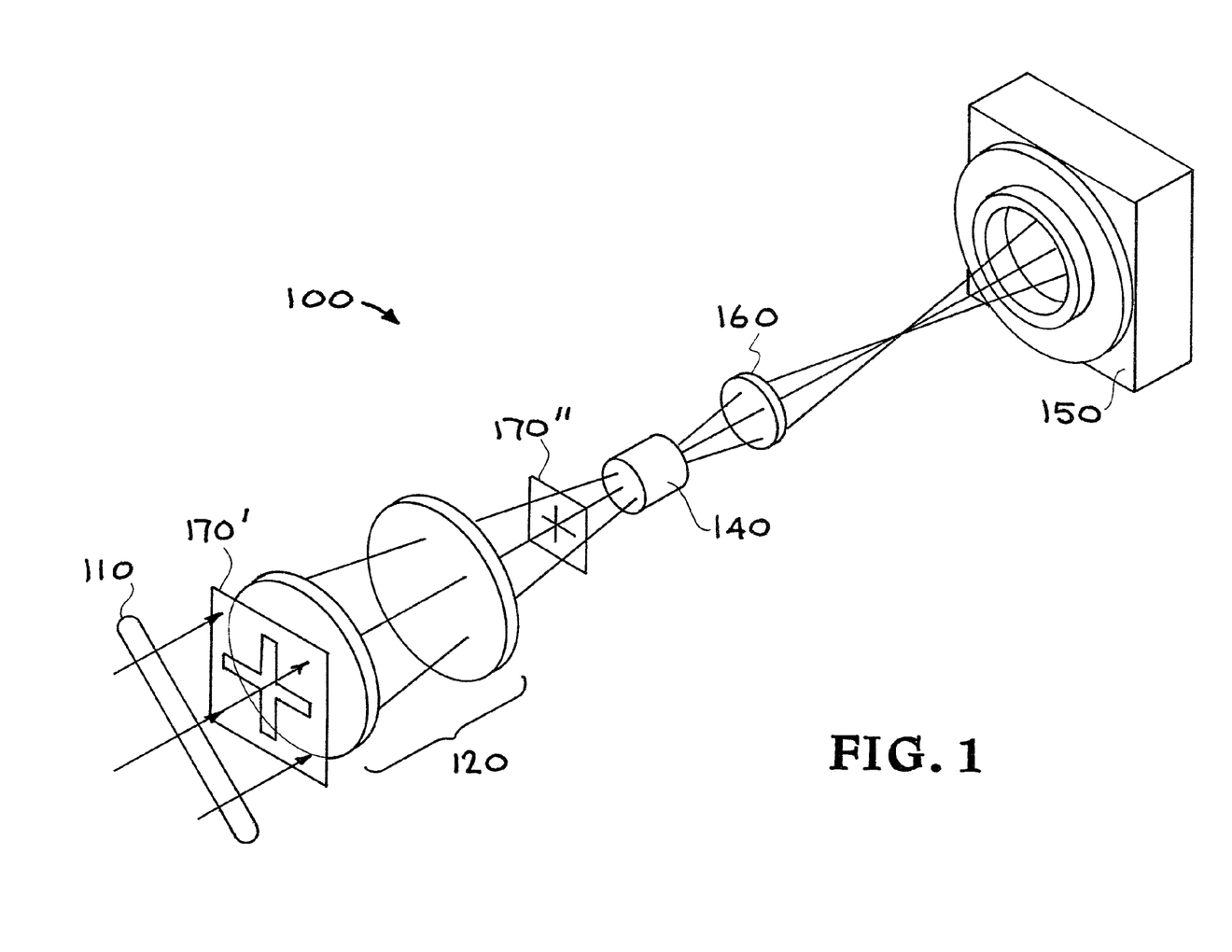
FIG. 1 shows a drawing of an exemplary embodiment of the present laser-beam pointing and centering system, which includes an upstream reference plane upon which a fiducial pattern is imposed; an intermediate reference pattern and an optical imaging system, comprising a telephoto lens, a bifocal lens and relay lenses that image the pair of reference patterns to a camera or video detector.

An exemplary embodiment of a basic optical diagnostic system 100 according to the present invention is shown in FIG. 1. An optical beam 110 is incident upon the system. The goal of the system is to determine the centering and pointing parameters of the beam 110 relative to the diagnostic system 100. The system 100 consists of an objective lens 120 (which is a telephoto lens in some embodiments), an upstream reference pattern 170' and an intermediate reference pattern 170", with the former pattern situated directly upstream of the objective lens and the latter pattern situated directly downstream of the objective lens. The upstream reference pattern 170' serves to provide spatial information necessary to enable precise centering alignment of the incident beam 110 with respect to the apparatus 100. The intermediate reference pattern 170" provides spatial information necessary to enable precise pointing alignment of the same beam. Downstream of the plane 170" is a bi-focal lens 140, optional relay optics 160, and, finally, a camera or other detector (e.g., a video camera), 150. In some embodiments, the bi-focal lens 140 is a catadioptric optical element, which will be described in more detail below. The incident optical beam 110 is of a nominal diameter that is usually greater than the spatial extent of the reference pattern 170', and is directed to enter the clear aperture of the system 100. The camera 150 is located along the optical axis and positioned at a common image plane of the pair of reference, or fiducial, planes 170' and 170". The pair of reference planes 170' and 170" is formed within the apparatus by the combination of the objective lens 120 and spatial patterns imposed at one or more of the planes. Relay optics 160 map the spatial information from the pair of reference planes onto the camera 150. Details pertaining to this pair of reference or fiducial planes 170' and 170", will be discussed below.

The choice of material for the optical elements is selected so that it is of high optical quality, relatively high optical damage threshold, with a high optical transmission coefficient, and with low absorption and scattering at the operating wavelength of the system. As an example, for an operating wavelength of approximately 1 μm, a suitable material is silicon dioxide, as is also well known in the art. The surfaces can be coated to minimize spurious reflections. The input and output surfaces of the bifocal lens, however, are coated to provide transmission and reflection coefficients so that both reference images possess approximately the same optical power at the input plane of the video camera 150.

One can appreciate that the reference planes 170' and 170" are equivalent to a pair of pinhole apertures in a conventional beam alignment system. In a conventional alignment system, the path of the optical beam must be ascertained at each pinhole aperture using a respective optical detector or sensor to enable the beam to pass through the given aperture with maximum power. By iterating on the centering and pointing adjustments, the power of the beam is maximized that passes through the pair of the pinholes. The alignment procedure therefore requires measuring the location of the optical beam power that passes through each aperture, independent of the other aperture. The present invention circumvents the need for this measurement apparatus. Instead of measuring the beam at two independent locations in space, the present invention enables the pair of measurement to be made at a single plane in space (the bifocal plane). Moreover, since the bifocal plane can be situated at any position along the optical axis of the instrument, this common imaging plane need not be physically located within the overall optical structures.

In some embodiments, the camera 150 is a multi-pixelated one-dimensional linear detector or a multi-pixelated two-dimensional detector with an array consisting of at least 500× 500 resolvable elements. In either case, the multi-pixel detector is capable of imaging the spatial information present at the pair of the respective reference planes 170' and 170". The spatial patterns that serve as the reference planes are designed to enable the camera 150 to spatially differentiate one pattern from the other at the common image plane. In addition, each spatial pattern so recognized is designed to provide sufficient spatial detail so that the desired overall precision of the centering and pointing alignment parameters can be attained. Each reference pattern consists of amplitude and/or phase information necessary for an operator or machine vision device to determine the magnitude and direction of the required laser beam adjustments.

The video camera system 150 can be further equipped with an internal microprocessor/computer for image processing and real-time alignment control functionality. As necessary, an optical bandpass filter can also be incorporated into the optical system to restrict the camera from being exposed by light outside the wavelength regime of interest. An optional image intensifier (not shown) can be placed immediately upstream of the input to the camera 150. The intensifier enables the system to detect low-power optical beams with shot-noise limited sensitivity, with the added benefit of minimizing the input optical power to the system 100 required for the measurement. In the case of a pulsed laser system, the image intensifier can be gated to be synchronous with the arrival of the laser pulse, thereby minimizing undesirable background light from saturating the intensifier.

In some embodiments, the upstream pattern is an opaque mask in the shape of a crosshair, whose line features are in the range of 1 mm to 4 mm in thickness. Hence, the beam 110 that passes through this mask appears as spot of light that fills most of the clear aperture of the device, but with a "shadow-like" feature in the shape of a crosshair imposed onto the beam. During the beam centering alignment process, the optical beam relative to the diagnostic is adjusted so that the optical beam is centered symmetrically with respect to the crosshair shadow. This operation can be realized using, as an example, a hill-climbing servo system so that the beam spot and crosshair patterns overlap symmetrically with respect to each other.

In alternate embodiments, different upstream mask patterns can be selected for 170', such as an opaque annular ring, or an ensemble of concentric rings of increasing diameters, or other forms of fiducial markings, all embossed onto an optical window. In this case, a high-quality optical flat, with anti-reflective coatings on both surfaces, can be utilized, with an annular ring pattern, or combination of spatial features, symmetrically formed with respect to the optical axis of the system. The annular ring can be fabricated using well-known deposition techniques including photolithographic masks, e-beam or ion-beam etching, etc. The region where the shadow feature is to be situated can be in the form of an opaque or highly scattering annular ring feature. In either case, the only light that remains and enters the system will consist of the "shadow" of the feature. This mask can also contain spatial information in the form of a phase-shifting pattern. In this case, a phase pattern can be fabricated by either growing a layer of transparent material onto the optical flat in the form of a two-dimensional pattern or by selectively etching a pattern into the optical flat with minimally scattering spatial features.

The intermediate reference pattern 170" is comprised of one or two overlapping two-dimensional spatial components, both in the form of an amplitude and/or phase pattern. One spatial component of the pattern at plane 170" is the pattern produce from the upstream pattern by reference pattern 170'. In some embodiments, the optical pattern is proportional to the spatial Fourier transform of the upstream reference pattern 170', details of which will be discussed below. A second component of the pattern at plane 170" can be an independent mask, physically positioned at the plane. This mask, as an example, can be fabricated using an optical flat, in the same manner as that utilized for the upstream pattern 170'. The patterns of the two reference masks are typically designed to enable discrimination of each imaged pattern that appears at the common image plane of the camera 150.

Figure 2:
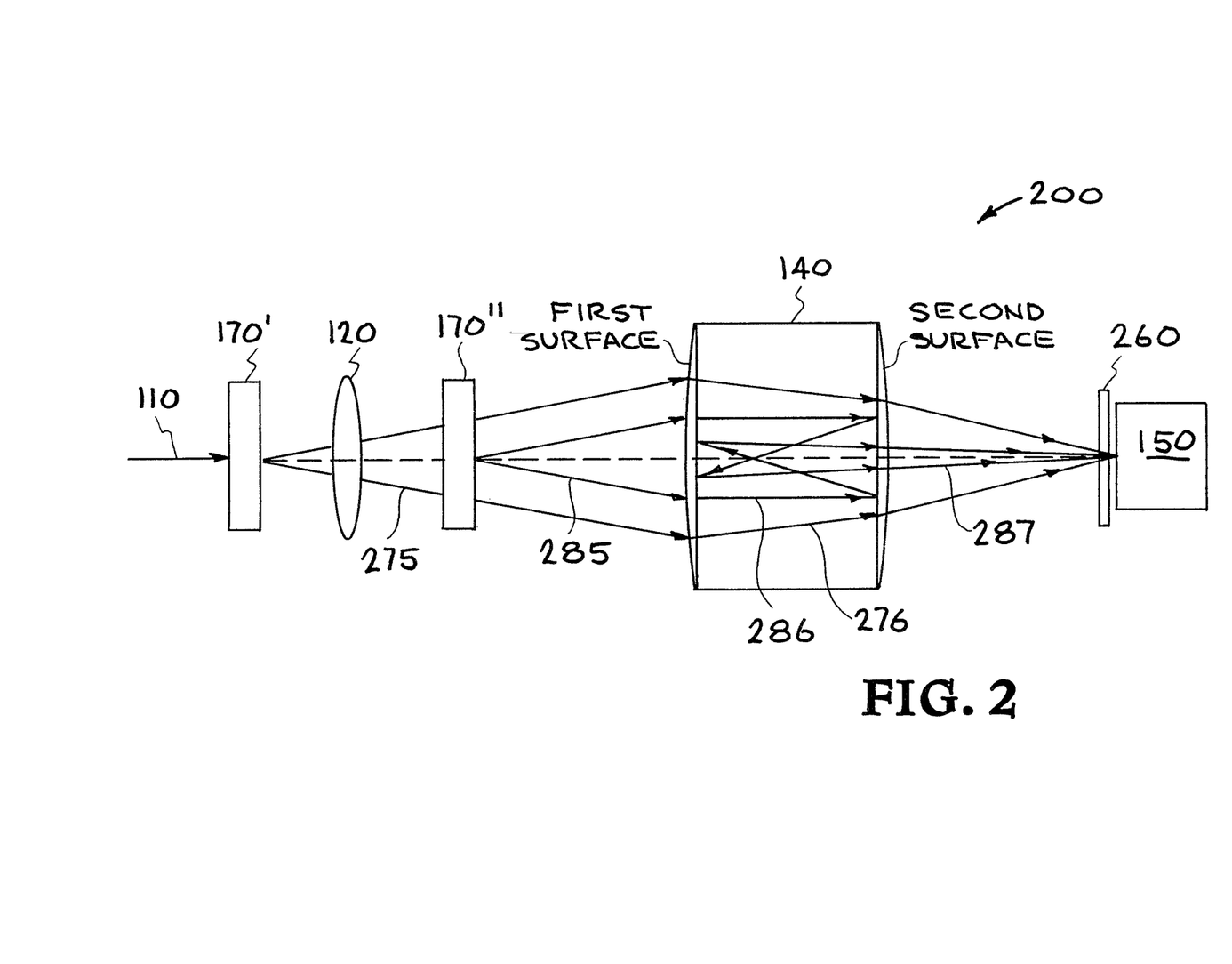
FIG. 2 depicts details of a bifocal, catadioptric lens, with a ray trace showing the formation of a pair of images at the camera plane via the two reference planes in the system.
Figure 3A:
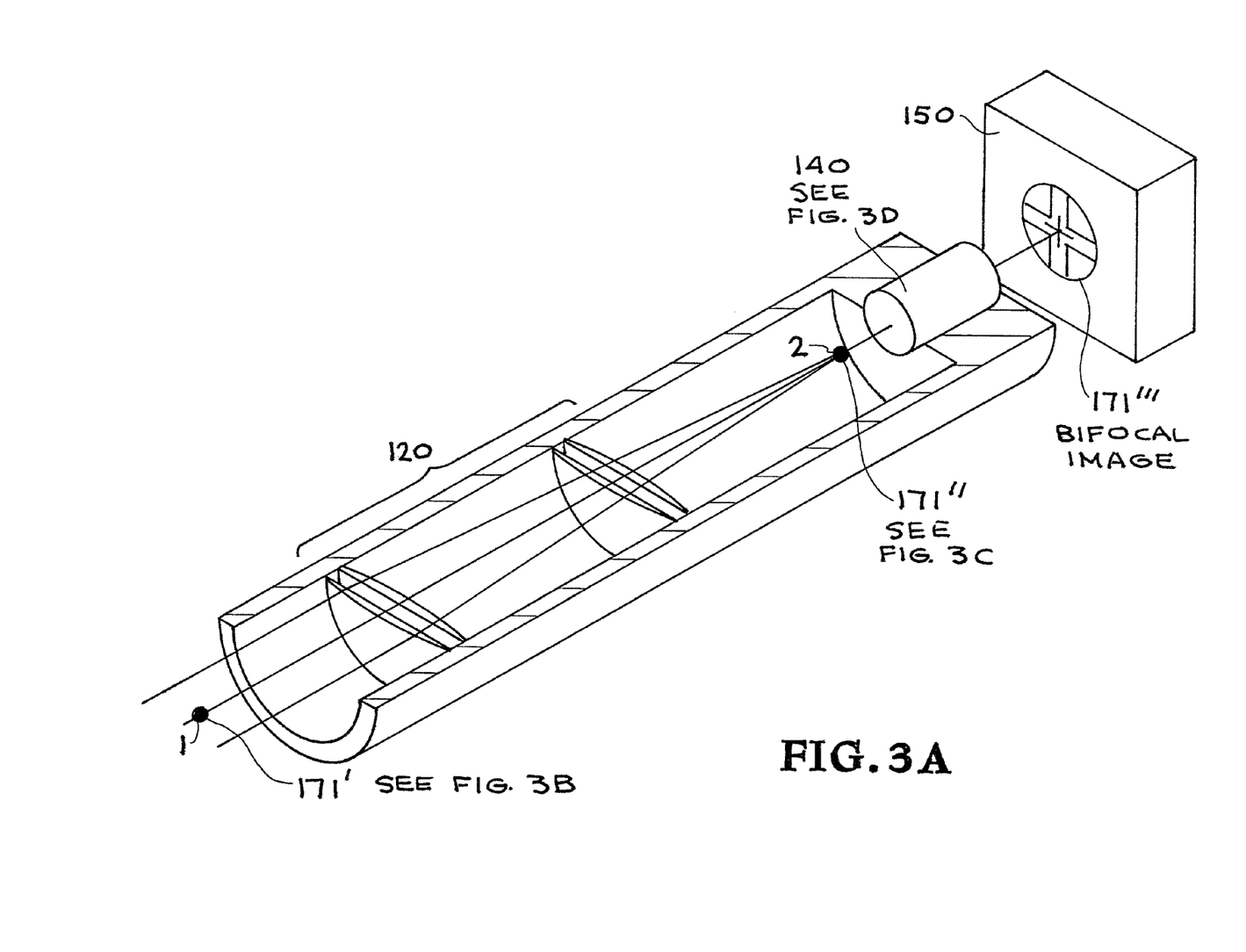
FIG. 3 shows an embodiment of the invention, including simulation results depicting images at the upstream and intermediate reference planes as well as the pair of images formed at the input to the imaging camera.
Figure 3B:
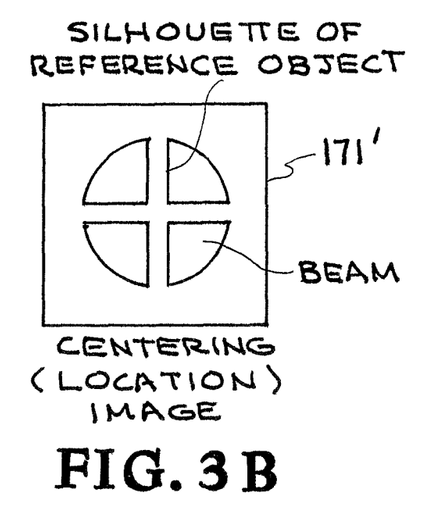
Figure 3C:
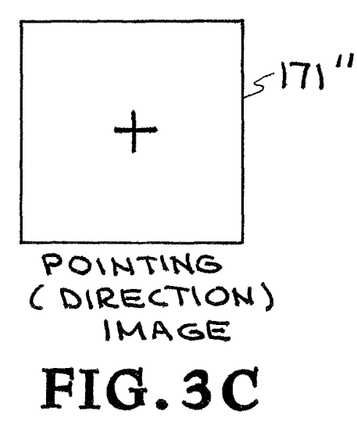
Figure 3D:
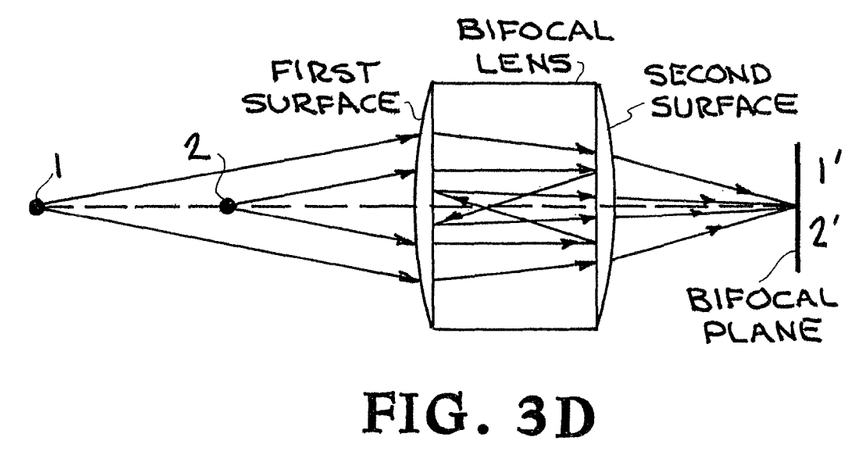

Turning now to FIG. 2, we discuss the function and design of the bifocal lens 140. The basic elements of exemplary elements of the overall optical system are also shown (the relay optical subsystem is not shown to simplify the details of the bifocal lens). A beam 110 is incident upon the optical system 200. The pointing and centering values of beam 110 relative to the system are sought. The pair of reference planes, 170' and 170", as shown in FIG. 1, are now shown in more detail in FIG. 2, both such planes being situated along the optical axis of the system 200 (dashed line). In some embodiments, upstream reference 170' consists of a spatial pattern placed upstream of the telephoto lens 120. The intermediate reference image 170" consists of the optical information, resulting from the operation of the telephoto lens 120, on the spatial pattern that appears at the upstream reference pattern 170'. In other exemplary embodiments (discussed below) an independent spatial pattern can be imposed at the plane 170". In some embodiments, the intermediate reference image 170" is situated at the downstream focal plane of the telephoto lens 120. Again, in some embodiments, the image at plane 170" is proportional to the spatial Fourier transform of the reference pattern located at reference plane 170'.

The bifocal lens 140 forms a pair of high-fidelity images at a common plane in space, referred to as the bifocal plane 260. One image is that of the spatial pattern imposed at plane 170'. The other image is that of a composite spatial pattern at plane, 170", consisting of one or more overlapping patterns: the first pattern is the optical information, as transformed from plane 170', by the lens 120. An optional spatial pattern can also be encoded onto the beam at plane 170" by placing an optional mask which is physically positioned at the intermediate reference plane 170". The bifocal lens 140 images both planes 170' and 170" at a common plane 260, which is the entrance aperture of camera 150.

By manipulating the laser beam relative to the overall optical system 200, precision geometrical alignment in both centering and tilt can be achieved. In some embodiments, one first adjusts the centering parameter of the system so that the incident laser (or other optical) beam and the image of the upstream reference pattern are mutually symmetric. Secondly, the tilt parameter is adjusted so that the pair of reference images formed at the camera plane is symmetric with respect to each other. Note that there is no need for an absolute transverse positioning of the camera plane. That is, alignment of the beam relative to the system can be realized if the overlap of each reference plane occurs off-axis with respect to the center of the camera pixel array. Hence, the alignment process can be achieved regardless of which pixels in the camera plane are illuminated.

Returning to FIG. 2, the bifocal lens is designed to form a pair of images, at a single common plane in space, referred to as a composite image, with each image derived from a different plane, spatially displaced from the other, both along a common optical axis (the dashed horizontal line in FIG. 2). To better understand the action of bifocal lens 140, we consider rays that emanate from both reference planes 170' and 170", as shown, respectively, by rays 275 and 285. It is required that the rays, 275 and 285, from these two planes each form a respective image at plane 260. Two requirements need to be satisfied to realize this embodiment. The first requirement is satisfied when the parameters for the telephoto lens 120 and the bifocal lens 140 are chosen so that the electric field present at plane 170' is precisely reproduced at plane 260. This condition enables one to image the pattern at plane 170' to plane 260. The ray trace in the figure illustrates this condition. Note that ray 275, which emerges from the axis at plane 170', is refracted by lens 120, and, subsequently, is refracted by the upstream surface of lens 140. The beam then propagates through this thick bifocal lens, shown as internal ray 276, and is then refracted by its second surface, emerging into space. The refracted beam then forms an image at plane 260, as depicted by the ray that forms along the optical axis at this plane.

In FIG. 2, an optical ray tracing overlay shows how the required image at plane 260 is derived from the pattern located at the intermediate reference plane 170". A typical ray that emanates from plane 170" is shown as ray 285. In this case, the bifocal lens is designed to function as a solid catadioptric element, in the form of a thick lens whose surfaces are partially transmitting and reflecting. Ray 285, which emanates from plane 170", is incident upon and refracted into lens 140 by the upstream surface of the lens, labeled as the "First surface." The first surface has a transmission of approximately 70% and a reflectivity of approximately 30%. The curvature of the First surface is chosen so that beam 285 propagates within the lens as a collimated beam, shown as ray 286. As an example, the radius of the first surface is in the range of 5 mm to 10 mm, and, more precisely 6.528 mm. The thickness of the bifocal lens is in the range of 5 mm to 15 mm, and, more precisely 12 mm. The internally collimated ray, 286, propagates through lens 140, and is then partially reflected back into the lens by the "Second surface," with a reflectivity of approximately 30% and a transmission of approximately 70%. The outer diameter, OD, of this optical element is in the range of 5 mm to 10 mm, and, more precisely 6.35 mm. As an example, the radius of the second surface is in the range of −10 mm to −20 mm, and, more precisely 16.378 mm. The internally reflected beam results in a second pass within the lens, but now as a converging beam. This converging beam is then partially reflected by the "First surface" back into lens 140, with a reflectivity of approximately 30%, resulting in a third pass within the lens. The converging beam is then refracted by the "Second surface" of lens 140, emerging from the lens and forming an image at the bifocal plane 260. The system is designed so that the bifocal lens parameters (curvature of the two air/glass interfaces and its thickness), as well as the telescopic lens 120 are chosen to enable the simultaneous imaging of fiducial reference planes 170' and 170" at the bifocal plane 260.

In some embodiments the intermediate reference plane 170" is chosen to be situated at the downstream focal plane of lens 120. For this choice of the placement of plane 170", the optical field distribution at this plane is proportional to the spatial Fourier transform of the pattern at plane 170'. Moreover, if the upstream reference plane 170' is positioned at the other (input) focal plane of lens 120, then the optical field formed at plane 170" is about equivalent to the mathematical spatial Fourier transform of the pattern at plane 170' (and may be rigorously equivalent with minor artifacts such as diffraction from finite apertures, lens aberrations, etc.). This special case, that the pair of reference planes is Fourier transforms of one another, is not a necessary condition for the proper functionality of the diagnostic. However, this unique operational relationship may lead to less complex post-processing algorithms and convergence pathways.

FIG. 3 shows an overall system perspective for an embodiment of the beam alignment system. As discussed above, a basic embodiment of the present system consists of an object lens (e.g., a telescopic lens) 120, a bifocal lens, as shown in 200 and a common image plane for recording the composite image, as shown at the camera plane 150. The pair of reference planes 170' and 170" are respectively located at points #1 and #2. Also shown are results of a simulation, of which the respective image simulations, 171', 171" and 171''' correspond to those appearing at positions #1 and #2 and at 150, respectively. The overall length of the device may be in the range of 10 cm to 100 cm, and, more precisely 40 cm.

FIG. 3 also shows a simulated set of images that are generated by the system. For this simulation, the upstream reference pattern consists of a spatial feature 171' in the form is a silhouette crosshair, which is placed at fiducial point #1. The telephoto lens 120 produces an intermediate reference pattern 171" at fiducial point #2, resulting from the combination of the upstream reference pattern and the action of the telephoto lens 120. The bifocal lens 140 images both fiducial patterns, forming a composite image at the bifocal plane, 171''', as it would appear at the entrance plane of the camera 150.

The goal of this system is to independently adjust the beam centering and the beam pointing controls so that a well-defined composite image is formed at the bifocal plane. The set of parameters that provide the preferred composite image therefore establishes knowledge of the path of the beam through space. The system can be utilized in a variety of alignment applications. As an example, consider the case of an optical receiver of free-space laser communications system. In this case, the transmitter beam may be fixed in space at a distant platform. Assume that one desires to configure an optical receiver, mounted on a remote platform, so that the receiver is precisely aligned with the incoming beam. In this situation, one desires to adjust the receiver so that the entering beam is centered with respect to the input aperture. In addition to entering the center of the receiver aperture, the apparatus must also be adjusted so that the entering beam is pointing along its optical axis, thereby optimizing the link alignment. Now, assume that the diagnostic is rigidly attached to the receiver so that it defines the optical axis. As discussed above the diagnostic enables one to independently adjust the centering and pointing parameters without having to sequentially focus and refocus to a pair of displaced fiducial points.

In some embodiments, as shown in FIG. 3, a simulation of the pair of images that result from a candidate reference object is shown, along with a simulation of the composite image seen at the common image plane, such as a camera 150. In this case, the upstream reference object, located at plane 170', is chosen as a crosshair with thickened lines. One image that results from the simulation is shown in 171'. This image plane corresponds to the alignment fiducial used for centering of the beam. The simulated image formed at the intermediate reference plane 170" is shown in 171", which corresponds to the alignment fiducial used for pointing of the beam. Lastly, the composite image formed at the camera plane 150, is shown in 171'''. The pair of fiducial images are clearly seen, and, for this choice of upstream reference pattern, the two resultant images can be easily discriminated, so that one image does not obscure the alignment of the other image, and, vice versa.

The diagnostic provides the viewer (or an automated tracker) with a pair of fiducial images, both of which are simultaneously focused to the same viewing (or, image) plane. Note that the adjustments for the centering and for the pointing operations are independent. Thus, one can select one parameter to initially align, say, the centering, followed by aligning the second parameter, in this case, the pointing adjustment. All that is required is that the second alignment pattern overlaps (or be in registration with) the first fiducial pattern, which can be formed on any region of the viewing screen. That is, the diagnostic does not require that the alignment be a function of a fixed reference on the system itself, for example, a central target region on the viewing screen. Thus, a conventional bore-sight alignment procedure is not necessary.

Figures 4A, 4B:
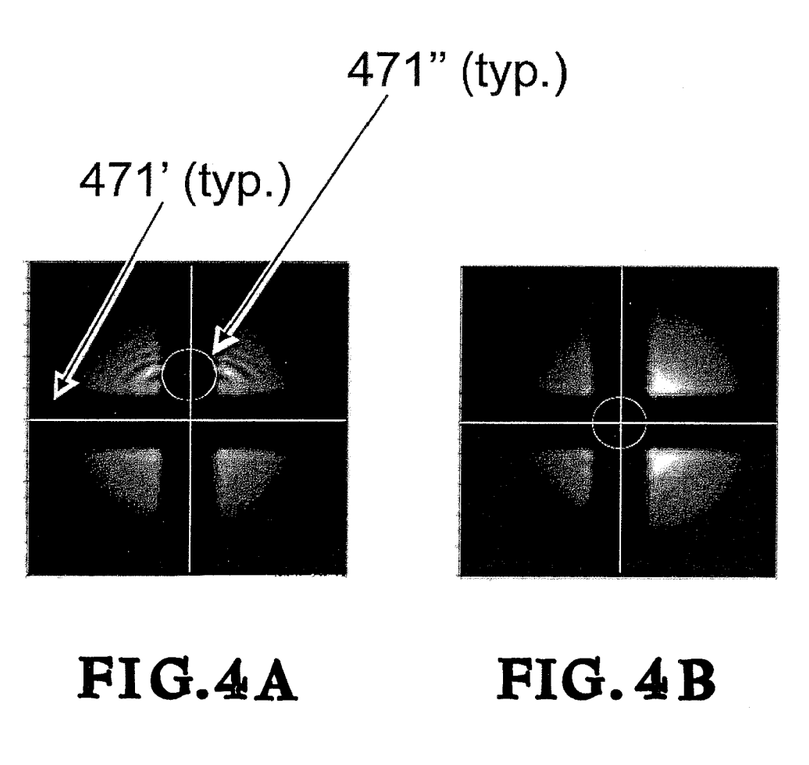
FIGS. 4A-4C show results of a simulation of the embodiment shown in FIG. 3 for three different alignment conditions.
Figure 4C:
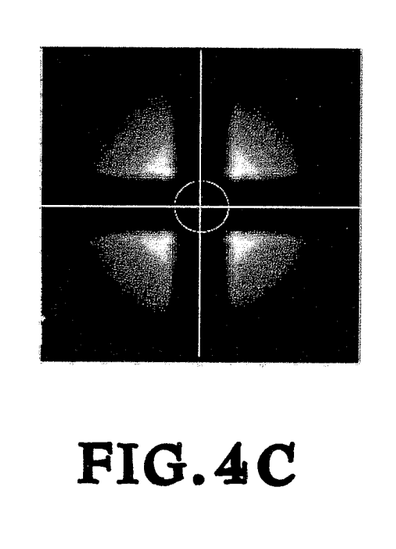

FIGS. 4A-4C depict the results of a simulation of the embodiment of FIG. 3 for three different alignment conditions. In all cases, the upstream reference pattern (shown as 170' in FIG. 3) is an opaque crosshair with slightly thickened lines. The intermediate reference pattern in this simulation (shown as 170" in FIG. 3) corresponds to the optical field at the intermediate plane, without an additional mask. In this case, the intermediate reference pattern is proportional to the spatial Fourier transform of the upstream reference pattern. The thin vertical and horizontal axes are guides to the eye. The thick crosshair is the centering fiducial image, imposed onto the upstream reference plane. The faint small spot bares the pointing fiducial information, as imaged from the intermediate reference plane in the system.

The simulated device images shown in FIGS. 4A-C correspond to typical composite images recorded at the camera image plane. Each image consists of two components: an image of the pattern used to determine the beam centering, in this simulation, a crosshair "shadow," 471', and, secondly, an image of the feature used to align the pointing of the beam; in this case, a faint spot of light, 471", which is an image of the intermediate reference pattern. The composite output image is shown for three different incident beam conditions FIG. 4A shows an error in the pointing of the beam (0.01 degrees error), but with perfect centering of the beam. FIG. 4B shows an error in centering of the beam (1 mm error), but with perfect pointing of the beam. FIG. 4C shows perfect centering and perfect pointing alignment of the beam. It is clear that in this simulation, pointing errors of less than 0.1 degrees and centering errors less than 1 mm can easily be resolved.

Figure 5:
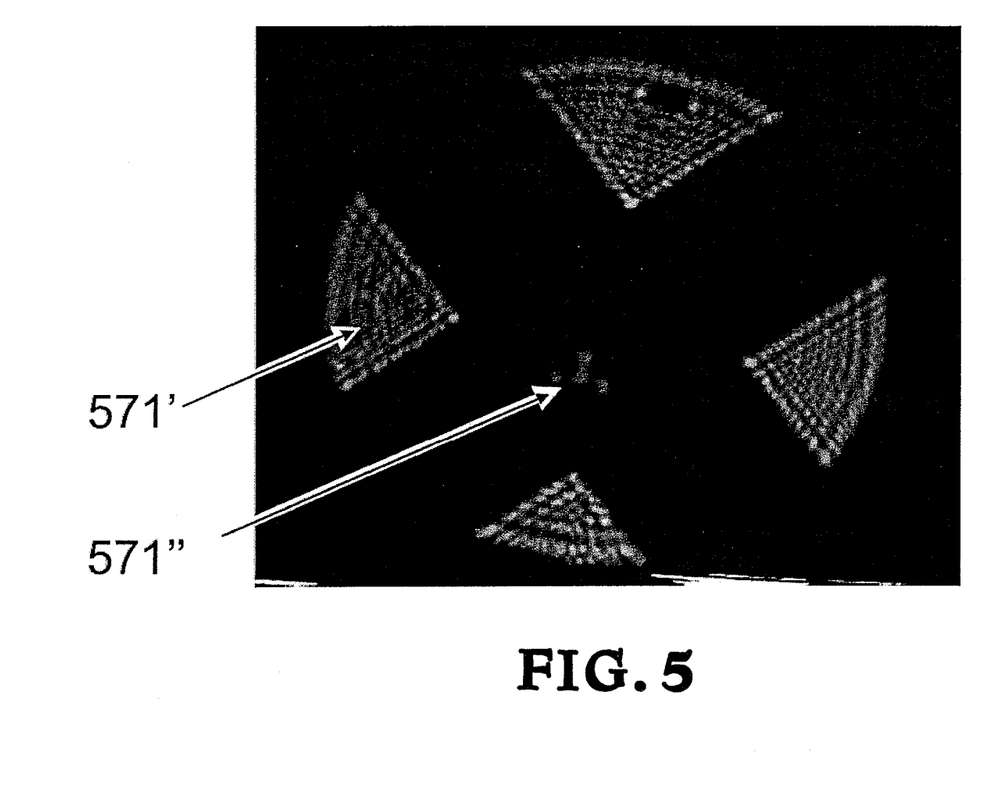
FIG. 5 shows results of a laboratory demonstration using the beam alignment apparatus (as depicted in FIG. 3) where the central feature in the image is the beam pointing fiducial pattern and the outer feature (a wide dark silhouette of a crosshair) is the beam centering fiducial pattern.

FIG. 5 shows results of a laboratory demonstration using the beam alignment apparatus depicted in FIG. 3. Note that the outer feature, the wide dark silhouette of a crosshair, 571', is the beam centering fiducial pattern. The central feature in the image, 571", is the beam pointing fiducial pattern. The basic alignment device is designed so that each image feature necessary for the given alignment operation is spatially separated in the composite image relative to the other. In this manner, the centering and the pointing adjustments can be made independent of each other, with minimal crosstalk, even though both image patterns are present simultaneously in the photograph.

Figure 6:
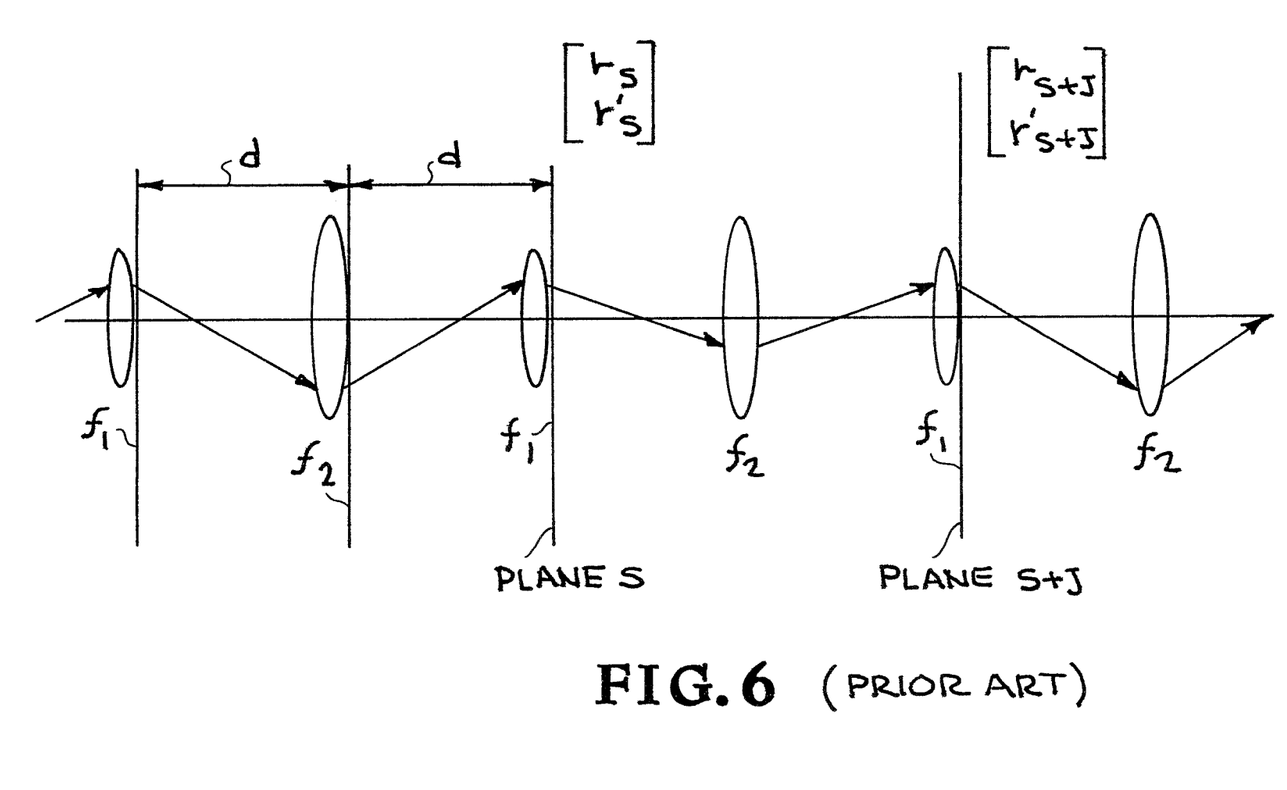
FIG. 6 shows a sketch of an optical imaging apparatus, referred to as a "periodic lens waveguide system," consisting of lenses with focal lengths $f_1$ and $f_2$.

FIG. 6 shows a basic optical subsystem that forms the basis of an alternate embodiment of this invention. This figure depicts a lens waveguide structure. The function of this multi-lens system is to provide a sequence of identical images of a given input pattern at multiple planes in space. This series of lenses consists of a repeating sequence of lenses, with each identical sequence herein referred to as a unit cell. Typically each such cell consists of several lenses or other optical components. Each unit cell generates an image at a given plane, which is identical to that of the previous unit cell, and so on.

Placing a spatial mask at Plane s, as an example, will result in a sequence of repeating, identical images of the given mask pattern, with each appearing at the same relative plane location within each successive unit cell. In this example, an image of the mask at Plane s would form at Plane s+1, reimage at Plane s+2, and, so on.

In a typical lens waveguide system, a single mask or spatial pattern is placed in the structure, with this image repeating after each unit cell. This basic structure is used in the art to emulate a stable optical cavity or a multimode optical fiber, the latter with a parabolic index profile. These are examples of optical devices in the art where an electric field pattern is replicated during a cavity round trip in the former case, or at well-defined points along the fiber in the latter case.

In general, the present invention requires two distinguishable patterns, which are spatially separated, to be imaged at a common plane. The lens waveguide structure can provide such a dual-mask imaging capability, which we now discuss (this basic system provides a key component in an alternate embodiment of this invention, to be discussed afterwards). As noted, it is desired to place at least two different masks in a lens waveguide subsystem, the goal being to generate a pair of output images, with both appearing at a common plane. Referring to FIG. 6, an approach to implement this using a lens waveguide is to place the first mask at an image plane within a given unit cell, and in a similar manner, place the second mask at an image plane in a different unit cell.

Referring to FIG. 6, by placing one mask at Plane s, and a different mask at Plane s+j, where j is an integer, a set of overlapping, or composite, images of Planes s and s+j will then appear at successive Planes s+j+n, where n is an integer. That is, at each successive image plane beyond the planes that contain the masks, say, Plane s+j+n of the lens waveguide system, a composite image will form. This composite image will consist of an overlapping image of both masks, with both images in focus simultaneously. In the context of the preferred embodiment of this invention, this lens waveguide subsystem replaces the combined set of the objective (e.g., telephoto) lens 120 and the bifocal lens 140 as shown in FIG. 1.

Figure 7:
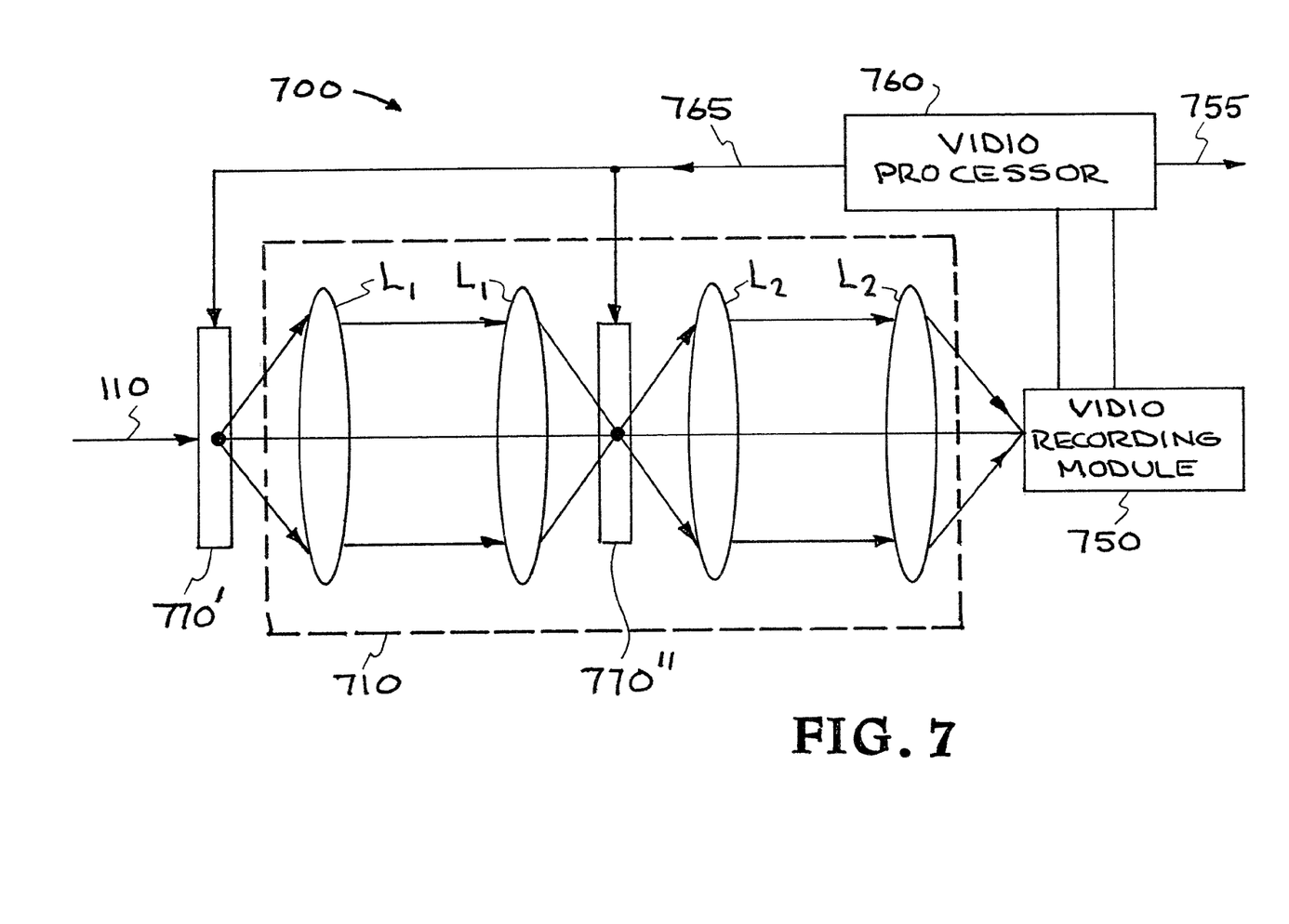
FIG. 7 shows an alternate exemplary embodiment of the invention the imaging optical components (the telephoto lens, the bifocal lens and the relay lenses) are replaced by a periodic lens waveguide imaging system.

FIG. 7 shows an alternate embodiment 500 of the invention that utilizes the lens waveguide subsystem depicted in FIG. 6. Recall that the basic invention emulates a pair of longitudinally separated optical apertures, with each virtual aperture imaged to a common plane, thereby forming a composite image of the pair. In FIG. 6, a lens waveguide subsystem 710 functions as a dual-mask, composite imager. In this example, the lens waveguide structure consists of two unit cells, with each cell comprised of two identical lenses. The upstream unit cell consists of lenses, $L_1$, and the second unit cell also consists of a pair of lenses, $L_2$. An upstream reference fiducial pattern 770' is placed at the upstream image plane of the $L_1$-$L_1$ unit cell of the multiple-lens subsystem 710. A second, intermediate reference pattern 770" is placed at an analogous input image plane of the $L_2$-$L_2$ unit cell, which also corresponds to the downstream (output) image plane of the first unit cell, $L_1$-$L_1$. The lens waveguide will then image the first fiducial pattern at the same plane within each unit cell along its length. As the image reforms, or "cascades" down the waveguide, the image is preserved, and finally forms an image at the camera plane of the video recording module 750. A second pattern placed downstream of the first pattern (say, at the last image plane in the waveguide structure) will also be imaged at the camera plane 750. This pair of images will therefore result in the desired composite image, as required for the function of beam centering and pointing. A benefit of this embodiment is that off-the-shelf optical elements can be utilized. The system can be scaled to greater separation lengths between the masks by simply adding additional unit cells along the path. In this case, the upstream reference mask can be placed at the image plane of the first unit cell in the sequence and the intermediate reference mask can be placed analogously at the last unit cell in the sequence. The increased longitudinal separation of the virtual pinholes results, concomitantly, in a greater precision of the centering and pointing alignment capability of the device, all else being equal. That is, the greater the spatial separation between the (virtual) apertures, the greater the accuracy of the alignment system, assuming equivalent devices.

During operation, a video processor 760 provides real-time control of a pair of reconfigurable and programmable reference patterns, 770' and 770". These dynamic masks can be in the form of spatial light modulators (SLMs), (high definition, pixilated two-dimensional addressable arrays of micro-electro-mechanical systems (MEMS), liquid crystals, etc.). The processor forms two functions: First, it inputs a given pattern to the SLM to generate the desired masks, which can be in the form of an amplitude pattern, a phase pattern or a combination thereof. Second, the processor can gate either SLM on or off in time. Hence, one can effectively decouple the spatial crosstalk by merely switching the mask patterns, so that when one mask is activated, the other mask is cleared, and, vice versa. These steps will prevent a simultaneous set of patterns to be incident at the camera plane. The switching speed can easily be faster than the response time of the human eye, so that both patterns will appear to be activated simultaneously to a human operator, free of flicker. Additional details of the programmable modes of operation are discussed in more detail below.

Returning to FIG. 7, auxiliary components in the system can be employed for additional system capability. As an example, an optional video processor 760 can provide an output error control signal 755 for servo-control of an automated centering and positioning alignment subsystem (not shown) in real-time. The processor 760 can also provide feedback information to the video recording device 750 to maintain the optimal dynamic range of a CCD camera, as an example. In addition, the processor 760 can also provide control signals 765 to update the mask patterns, 770' and 770", as needed, so that the convergence of the alignment process can be optimized, both in terms of precision as well as convergence time of the measurement. As an example, the spatial pattern can be initially selected to enable coarse alignment. Subsequently, by updating the mask to resolve finer spatial features, greater alignment precision can be achieved.

In order to enable more efficient control of the alignment process, it is beneficial to minimize crosstalk of the pair of images that appear at the common image plane. As an example, it can be deleterious to the alignment operation if the reference patterns spatially overlap at the common image plane and obscure each other, which can compromise the functionality of a servo-control system. (This condition applies to the case of non-interferometric coupling of the images; below we discuss a case where interferometric coupling of the images is beneficial). In such cases, there are several embodiments that can minimize, if not eliminate, crosstalk.

One approach is to design the reference masks so that, even if there is some degree of spatial overlap, the necessary spatial features for the centering and pointing adjustments do not adversely affect each other. As an example, in the simulation results shown in FIG. 4, there is a high degree of spatial discrimination to the reference patterns so that they are distinguishable. The actual data recorded in FIG. 5 also shows a case where the pair of reference patterns is easily discernable. Another method of spatial discrimination is to select reference masks such that each reference pattern is imaged at a different location at the common image plane. In this case, one must incorporate this modification into a real-time video processor to accommodate this systematic effect, such as by electronically producing phantom video representation of the patterns to enable the alignment process. There exist situations in which there is unavoidable overlap so that optical interference effects, such as the formation of fringe patterns, can obscure the necessary measurements. In these cases, one can select a laser whose coherence length is less than the physical separation of the reference masks, or vice versa. Another embodiment utilizes a conventional incoherent source in place of a laser. Such sources include an LED or high intensity lamp (filament, fluorescent, Xe, halogen, etc.). In either case, fringe patterns can be minimized, if not eliminated entirely.

In all the above approaches, one typically compromises the ultimate precision of the technique by constraining the choice of patterns to function in the presence of spatial overlap. Beyond such constraints, one can employ temporal gating to enable both reference patterns to be chosen for optimal alignment precision, while displaying alternating images in time. In the case of a repetitively pulsed laser, each alternating pulse can be associated with a given mask. This approach can be incorporated into a computer control algorithm so that the alignment process is temporally synchronized with the gating of the reference images. Therefore, each reference image is treated separately in time, yet the effective overlapping of the images is maintained. Hence, one can design optimal masks without spatial overlapping constraints. The embodiment shown in FIG. 7 can be used in this case. As an example, the video processor 760 can provide control signals 765 to alternate the activation of the programmable masks, 770' and 770", in the time domain.

Another operational regime involves utilizing interferometric effects to advantage. In this case, the composite images have a greater degree of spatial complexity. This follows since, in addition to the spatial overlap of the individual reference patterns (as in the above case), there are additional spatial features present due to the coherent summation of the optical fields that comprise the reference patterns. Hence, a relatively complicated optical interference pattern appears as a result of the coherent (phasor) summation of the composite image fields. In spite of a more complex composite image, the ultimate precision of the alignment can be improved by factors of 1,000 or more (relative to the non-coherent composite imagery) by using this interferometric coupling of the composite images at the common image plane (e.g., 750 in FIG. 7).

In the case of non-coherent composite image formation, the precision of the system can be estimated using geometrical considerations. One can show that the optimal angular resolution of a dual effective pinhole alignment system scales as the ratio of the effective pinhole aperture size relative to the longitudinal separation of the pinholes. As a numerical example, if one assumes that the spot size at the camera plane is on the order of 100 μm and that the longitudinal separation of the reference planes is ≈10 cm, then the angular resolution is approximately equal to 100 μm/10 cm≈1 mrad. A similar argument can be made in terms of the centering resolution.

In the case of a coherent interaction of the pair of composite images, an interferometric analysis can provide insight as to the ultimate precision of this modality. The spatial property of a fringe pattern is a function of the angle between a pair of nearly co-propagating interfering beams. As this angular separation approaches zero, the number of the fringes across a given aperture will decrease. A fringe is formed when the path difference between two optical beams is approximately one optical wavelength. The angular resolution in this case depends on the ability of a system to resolve a fraction of a fringe, which is directly related to the wavelength (i.e., one fringe appears for a path-length difference of one wavelength). Therefore, the angular resolution of an interferometric system scales as the ratio of the fractional fringe measurement resolution relative to the distance between the two measuring planes. Therefore, assuming that one can measure a fraction of a fringe, e.g., to within one tenth of a fringe, an operating wavelength of 1μ, and a separation of 10 cm, the system angular resolution≈0.1 fringe/separation≈0.1 μm/10 cm≈1 μrad. Hence, the angular resolution of this class of coherent beam alignment system can outperform that of the incoherent, or, equivalent pinhole beam, alignment system by a factor of 1,000 fold.

The embodiments discussed in this invention, or, variations thereof, can therefore be utilized in either or both measurement domains discussed herein, namely, the incoherent and the coherent image coupling modalities. As an example, using the embodiment shown in FIG. 7, one can initially program the alignment system to align the system in the incoherent mode, followed by a more precise alignment process using the coherent mode. Each mode of operation, may, in general, involve specifying different sets of respective reference patterns onto the respective masks, or spatial light modulators 770' and 770", via the video control module 760. In this dual-mode alignment embodiment, one initially imposes a pair of masks designed to function in the incoherent mode, which may involve spatial separation or temporal gating of the patterns to advantage. Then, the servo system adjusts the centering and pointing controllers via output signal 755. Upon convergence, the controller switches to the interferometric mode, and provides a different set of programmable masks for the reference planes 770' and 770". As discussed above, in this mode, the reference masks are specified to generate spatially and temporally overlapping patterns. The controller algorithm also changes, since, in general, for this mode, the video recorder records interference fringes as opposed to a mask with fiducial indicators.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. A method, comprising:
directing a beam of light on or about an optical axis that terminates at an image plane, wherein said beam passes through a first object and then through a second object and then through an optical element before propagating onto said image plane, wherein said first object is fixedly placed in line with said optical axis, wherein said first object is configured to impart a first pattern on said beam as it propagates on or about said optical axis, wherein said second object is fixedly placed in line with said optical axis, wherein said second object is located between, and spaced from, (i) said first object and (ii) said image plane, wherein said second object is configured to impart a second pattern on said beam and wherein said optical element is fixedly placed in line with said optical axis and located between and spaced from (i) said second object and (ii) said image plane, wherein said optical element is configured to simultaneously form an image of said first pattern and an image of said second pattern at said image plane;
imparting a first pattern to said beam of light to produce a patterned beam, wherein said first pattern is imparted with said first object;
imparting a second pattern to said patterned beam to produce a combined patterned beam, wherein said second pattern is imparted with said second object;
imaging said combined patterned beam to a single plane to produce an imaged combined patterned beam, wherein said combined pattern beam is imaged with said optical element; and
capturing said imaged combined patterned beam with a single detector to produce a captured imaged beam.

2. The method of claim 1, wherein said first object is selected from the group consisting of a mask, a spatial pattern., a spatial light modulator, an array of micro-electro-mechanical systems detector elements and liquid crystals.

3. The method of claim 1, wherein said second object is selected from the group consisting of a mask, a spatial pattern, a spatial light modulator, an array of micro-electro-mechanical systems detector elements and liquid crystals.

4. The method of claim 1, wherein said optical element comprises a catadioptric lens.

5. The method of claim 1, wherein said first pattern and said second pattern each comprises a coherent pattern such that said combined patterned beam comprises an interference pattern.

6. The method of claim 1, wherein at least one of said first pattern and said second pattern comprise at least one of a phase pattern and an amplitude pattern.

7. The method of claim 1, wherein said detector comprises a camera.

8. The method of claim 7, wherein said camera is selected from the group consisting of a video camera and a multi-pixel detector.

9. The method of claim 1, further comprising temporally modulating at least one of said first pattern and said second pattern.

10. The method of claim 1, further comprising processing said captured imaged beam to produce processed data, the method further comprising altering the direction of propagation of said beam to a direction that is selected from the group consisting a better centering of said beam on said optical axis and a better pointing of said beam to the point where said beam terminates at said image plane.

11. The method of claim 1, further comprising gating at least one of said first pattern and said second pattern.

12. An apparatus, comprising:
a first object for imparting a first pattern to an input beam of light to produce a patterned beam, wherein said first object is fixedly placed on an optical axis, wherein said first object is configured to impart said first pattern on said input beam as it propagates on or about said optical axis;
a second object for imparting a second pattern to said patterned beam to produce a combined patterned beam, wherein said second object is fixedly placed on said optical axis and is located between, and spaced from, (i) said first object and (ii) an image plane located on said optical axis, wherein said second object is configured to impart said second pattern to said patterned beam;
an optical element configured for imaging said combined patterned beam onto said image plane to produce an imaged combined patterned beam, wherein said optical element is fixedly placed on said optical axis and is located between, and spaced from, (i) said second object and (ii) said image plane, wherein said optical element is configured to simultaneously form an image of said first pattern and an image of said second pattern at said image plane; and
a detector for capturing said imaged combined patterned beam to produce a captured imaged beam.

13. The apparatus of claim 12, wherein said first object is located a positive distance from said second object.

14. The apparatus of claim 12, wherein said first object is selected from the group consisting of a mask, a spatial pattern, a spatial light modulator, an array of micro-electro-mechanical systems detector elements and liquid crystals.

15. The apparatus of claim 12, wherein said second object is selected from the group consisting of a mask, a spatial pattern, a spatial light modulator, an array of micro-electro-mechanical systems detector elements and liquid crystals.

16. The apparatus of claim 12, wherein said optical element comprises a catadioptric lens.

17. The apparatus of claim 12, wherein said deector comprises a multi-pixel detector.

18. The apparatus of claim 12, further comprising means for gating at least one of said means for imparting a first pattern and said means for imparting a second pattern.

19. The apparatus of claim 12, further comprising means for temporally modulating at least one of said first pattern and said second pattern.

20. The apparatus of claim 12, further comprising means for processing said captured imaged beam to produce processed data, the apparatus further comprising means for adjusting at least one of said first pattern and said second pattern.

21. An apparatus, comprising:
an optical axis terminating at an image plane;
a first object fixedly placed on said optical axis, wherein said first object is configured to impart a first pattern at said first object on a beam propagating on said optical axis toward said image plane;
a second object fixedly placed on said optical axis, wherein said second object is located between and spaced from said first object and said image plane, wherein said second object is configured to impart a second pattern at said second object on said beam; and
a lens fixedly placed on said optical axis and located between and spaced from said second object and said image plane, wherein said lens is configured to form an image of said first pattern and an image of said second pattern at said image plane.

22. A method, comprising:
directing a beam of light on or about an optical axis that terminates at an image plane, wherein said beam passes through a first object and then a second object and then an optical element before propagating onto said image plane;
wherein said first object is fixedly placed on said optical axis, wherein said first object is configured to impart a first pattern on said beam as it propagates on said optical axis;
wherein said second object is fixedly placed on said optical axis, wherein said second object is located between, and spaced from, said first object and said image plane, wherein said second object is configured to impart a second pattern on said beam; and
wherein said optical element is fixedly placed on said optical axis and located between and spaced from said second object and said image plane, wherein said optical element is configured to simultaneously form an image of said first pattern and an image of said second pattern at said image plane.

* * * * *